(12) United States Patent
Miyagawa

(10) Patent No.: US 6,542,599 B1
(45) Date of Patent: Apr. 1, 2003

(54) SUBSCRIBER SYSTEM TRANSMISSION APPARATUS WITH LINE CONCENTRATING CAPABILITY

(75) Inventor: Takeshi Miyagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/287,359

(22) Filed: Apr. 7, 1999

(30) Foreign Application Priority Data

Jul. 23, 1998 (JP) ............................................ 10-207363

(51) Int. Cl.[7] .......................... H04M 7/00; H04M 1/00; H04M 3/00; H04B 7/212; H04J 3/00
(52) U.S. Cl. .................. 379/221.03; 379/372; 379/333; 370/54; 370/337; 370/15
(58) Field of Search ........................... 370/15, 337, 54; 379/372, 221.03, 333

(56) References Cited

U.S. PATENT DOCUMENTS 4,393,492 A * 7/1983 Bishop ......................... 370/15
5,386,417 A * 1/1995 Daugherty et al. ........... 370/54
5,473,682 A * 12/1995 Tanaka ........................ 379/372
5,881,059 A * 3/1999 Deschaine et al. .......... 370/337

FOREIGN PATENT DOCUMENTS

JP 54-100609 8/1979

* cited by examiner

Primary Examiner—Ahmad F. Matar
Assistant Examiner—Thjuan P Knowlin
(74) Attorney, Agent, or Firm—Katten Muchin Zavis Rosenman

(57) ABSTRACT

A subscriber system transmission apparatus has a line concentrating capability which is performed a relatively simple efficient redundant structure for increased overall system reliability. A remote terminal has a mode selector for switching between modes of operation such that when a remote terminal line concentrating and connecting unit suffers a fault, no line concentrating process is effected on a call from a subscriber's terminal, and the call is connected directly to a trunk transmission line by a bypassing unit. When the remote terminal line concentrating and connecting unit suffers a fault, since the call is not subjected to a line concentrating process in the remote terminal, the call from the remote terminal is subjected to a line concentrating process by a central terminal line concentrating and connecting unit in a central terminal.

12 Claims, 9 Drawing Sheets

SUBSCRIBER SYSTEM TRANSMISSION APPARATUS WITH LINE CONCENTRATING CAPABILITY

BACKGROUND OF THE INVENTION (1) Field of the Invention

The present invention relates to a subscriber system (access system) transmission apparatus with a line concentrating capability, and more particularly to a subscriber system transmission apparatus with a line concentrating capability, which comprises one or more remote terminals connected to subscriber's terminals and a single central terminal connected to an exchange.

(2) Description of the Related Art

The subscriber system transmission apparatus with the line concentrating capability according to the present invention is applicable to PDH (Plesiochronous Digital Hierarchy) or SDH (Synchronous Digital Hierarchy), and is governed by the V5.2 protocol according to the ITU-T (International Telecommunication Union—Telecommunication Sector).

FIG. 8 of the accompanying drawings shows in block form a conventional point-to-point subscriber system transmission apparatus with a line concentrating capability. As shown in FIG. 8, the subscriber system transmission apparatus comprises a RT (Remote Terminal) transmission device 110 with a line concentrating capability and a CT (Central Terminal) transmission device 120 with no line concentrating capability, the RT transmission device 110 and the CT transmission device 120 being connected to each other. A plurality of subscriber's terminals 100, each in the form of a telephone set, are connected to the RT transmission device 110, and an exchange 130 is connected to the CT transmission device 120. The RT transmission device 110 and the CT transmission device 120 may be installed at locations that are several kilometers spaced from each other.

The RT transmission device 110 comprises a subscriber circuit (CH) 111 for converting an analog signal to a digital signal, a tributary bus (Bus) 112, a line concentrator connector (TSA) 113 for assigning time slots, a trunk bus (Bus) 114, a terminal unit (OPT) 115 for converting an electric signal to an optical signal, and a line concentration controller (V5MC) 116 for controlling the line concentrator connector 113 to effect a line concentrating process. The line concentration controller 116 and the line concentrator connector 113 jointly effect a line concentrating process which assigns a call to an idle channel in a trunk transmission line each time the call is requested from a subscriber's terminal 100. Even if the trunk transmission line has a smaller number of channels than the number of subscriber's terminals 100, the trunk transmission line can connect calls from subscriber's terminals 100.

The CT transmission device 120 comprises a terminal unit (OPT) 121 for converting an optical signal to an electric signal, a trunk bus (Bus) 122, a time slot assignment unit (TSA) 123 for assigning time slots, a tributary bus (Bus) 124, and a terminal unit (Trib Card) 125 for interfacing signals according to the V5.2 protocol. The CT transmission device 120 has no line concentrating capability.

To provide against a fault of the line concentrating capability, the line concentration controller 116 and the line concentrator connector 113 have a redundant structure.

If the subscriber system transmission apparatus with a line concentrating capability is of the point-to-multipoint call processing type, then the redundant structure is so complex that the circuit arrangement which is required contains superfluous circuit elements.

FIG. 9 of the accompanying drawings shows in block form a conventional point-to-multipoint subscriber system transmission apparatus with a line concentrating capability. As shown in FIG. 9, the point-to-multipoint subscriber system transmission apparatus has n RT transmission devices (RT#1–RT#n) 210–213 connected to a single CT transmission device (CT) 220. Each of the RT transmission devices 210–213 has an internal structure which is identical to the internal structure of the RT transmission device 110 shown in FIG. 8. The CT transmission device 220 has an internal structure which is the same as the internal structure of the CT transmission device 120 shown in FIG. 8 except that the transmission device 220 has a plurality of terminal units (OPT) 221a–221d, each identical of the optical terminal 121 shown in FIG. 8, which are connected respectively to the RT transmission devices 210–213. A plurality of sets of subscriber's terminals 200, 201, 202, 203, each in the form of a telephone set, are connected to the RT transmission devices 210–213, respectively, and an exchange 230 is connected to the CT transmission device 220.

If the point-to-multipoint subscriber system transmission apparatus has a redundant structure associated with the line concentrating capability for protection against a fault of the line concentrating capability, then each of the RT transmission devices 210–213 needs to have two line concentration controllers and two time slot assignment units. As a result, the point-to-multipoint subscriber system transmission apparatus is necessarily large in system arrangement. Accordingly, it is desirable to simplify the system arrangement of the point-to-multipoint subscriber system transmission apparatus and efficiently utilize the circuit arrangement thereof.

In the event of a fault in either one of the channels in the trunk transmission line of the RT transmission device 110 shown in FIG. 8, the block loss probability increases to the extent that it will be difficult for telephone calls to be connected. The block loss probability is a probability that a call connection will be rejected because the trunk transmission line has no available idle channel for a call request from a subscriber's terminal 100. This problem also occurs in the point-to-multipoint subscriber system transmission apparatus.

Furthermore, if an increased number of calls are made by subscriber's terminals 100 in the RT transmission device 110 shown in FIG. 8, then the block loss probability also increases, making it difficult for those calls to be connected. The point-to-multipoint subscriber system transmission apparatus also suffers this drawback.

SUMMARY OF THE INVENTION

It is therefore an object of the present invention to provide a subscriber system transmission apparatus with a line concentrating capability which is performed by a relatively simple efficient redundant structure for increased overall system reliability.

To achieve the above object, there is provided in accordance with the present invention a subscriber system transmission apparatus with a line concentrating capability, having a remote terminal connected to a subscriber's terminal and a central terminal connected to an exchange. The subscriber system transmission apparatus has remote terminal line concentrating and connecting means disposed in the remote terminal, for effecting a line concentrating process on a call from the subscriber's terminal to assign the call to a trunk transmission line, bypassing means disposed in the remote terminal, for bypassing the remote terminal line concentrating and connecting means to connect a call from the subscriber's terminal directly to the trunk transmission line, mode selecting means disposed in the remote terminal, for selecting a mode of operation of the remote terminal line concentrating and connecting means when the remote terminal line concentrating and connecting means operates normally and selecting a mode of operation of the bypassing means when the remote terminal line concentrating and connecting means suffers a fault, central terminal line concentrating and connecting means disposed in the central terminal, for effecting a line concentrating process on a call from the remote terminal to assign the call to an exchange transmission line, and selecting means for sending a call from the remote terminal to the exchange transmission line when the remote terminal line concentrating and connecting means operates normally and operating the central terminal line concentrating and connecting means when the remote terminal line concentrating and connecting means suffers a fault.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of the present invention will first be described below with reference to FIG. 1.

Figure 1:
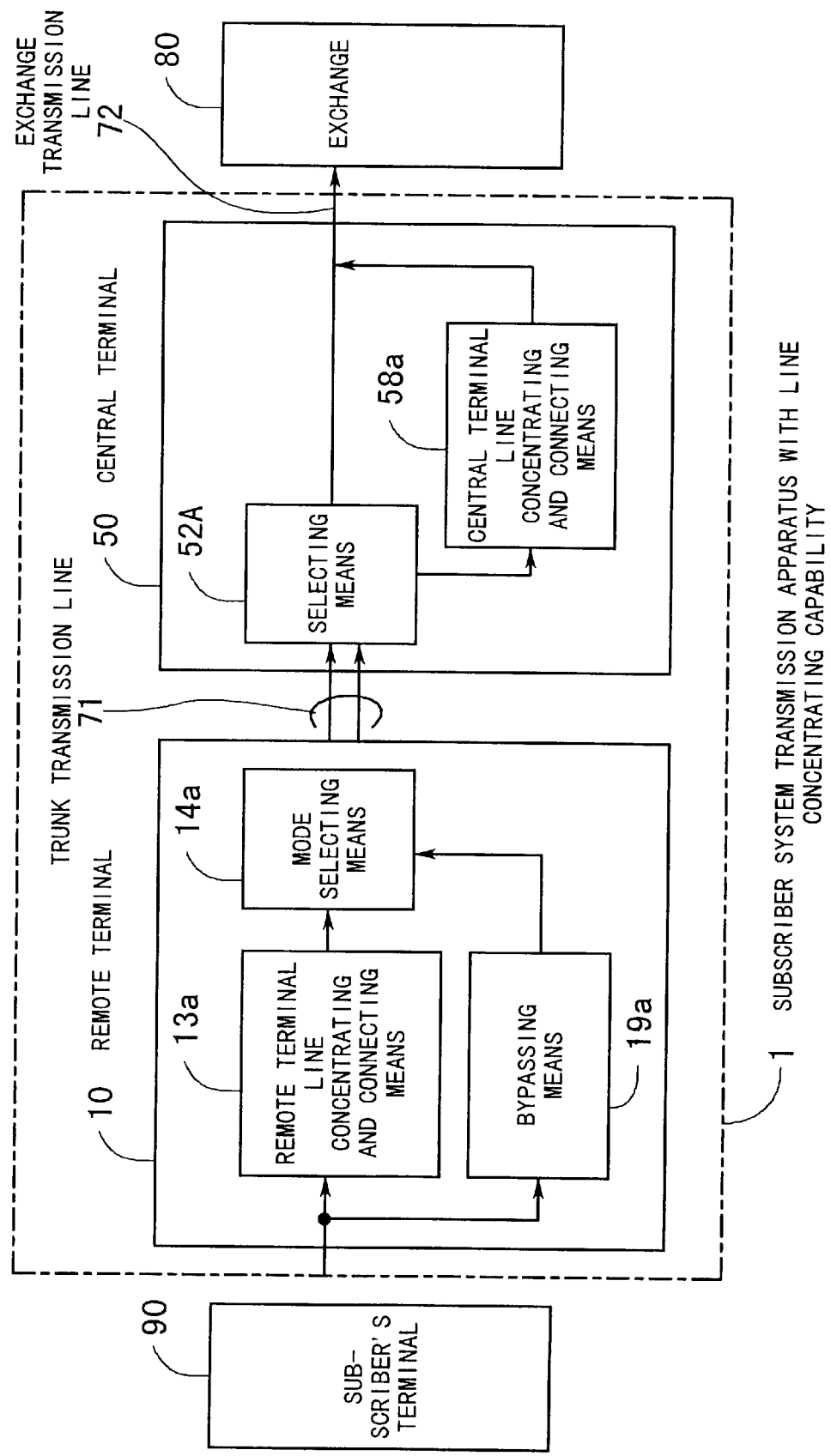
FIG. 1 is a block diagram illustrative of the principles of the present invention.

As shown in FIG. 1, a subscriber system transmission apparatus 1 with a line concentrating capability comprises a remote terminal 10 and a central terminal 50 which are connected to each other. The remote terminal 10 comprises a remote terminal line concentrating and connecting means 13a for effecting a line concentrating process on a call from a subscriber's terminal 90 to assign the call to an idle channel in a trunk transmission line 71, a bypassing means 19a for bypassing the remote terminal line concentrating and connecting means 13a to connect a call from the subscriber's terminal 90 directly to the trunk transmission line 71, and a mode selecting means 14a for selecting the mode of operation of the remote terminal line concentrating and connecting means 13a when the remote terminal line concentrating and connecting means 13a operates normally and selecting the mode of operation of the bypassing means 19a when the remote terminal line concentrating and connecting means 13a suffers a fault. The central terminal 50 comprises a central terminal line concentrating and connecting means 58a for effecting a line concentrating process on a call from the remote terminal 10 to assign the call to an exchange transmission line 72, and a selecting means 52A for sending a call from the remote terminal 10 to an idle channel in the exchange transmission line 72 when the remote terminal line concentrating and connecting means 13a operates normally and operating the central terminal line concentrating and connecting means 58a when the remote terminal line concentrating and connecting means 13a suffers a fault. The mode selecting means 14a and the selecting means 52A are connected to each other by the trunk transmission line 71, and the central terminal 50 is connected to an exchange 80 by the exchange transmission line 72. While only one subscriber's terminal 90 is shown in FIG. 1, there are actually a plurality of subscriber's terminals 90 connected to the remote terminal 10.

The mode selecting means 14a in the remote terminal selects either the mode of operation of the remote terminal line concentrating and connecting means 13a or the mode of operation of the bypassing means 19a. Specifically, when the remote terminal line concentrating and connecting means 13a operates normally, the mode selecting means 14a selects the mode of operation of the remote terminal line concentrating and connecting means 13a to assign a call from the subscriber's terminal 90 to an idle channel in the trunk transmission line 71 in a line concentrating process. When the remote terminal line concentrating and connecting means 13a suffers a fault, no line concentrating process is carried out, and the mode selecting means 14a selects the mode of operation of the bypassing means 19a to connect a call from the subscriber's terminal 90 directly to the trunk transmission line 71 while bypassing the remote terminal line concentrating and connecting means 13a. For such a direct call connection, the trunk transmission line 71 has as many channels as the number of subscriber's terminals 90.

The selecting means 52A in the central terminal 50 selectively operates the central terminal line concentrating and connecting means 58a. Specifically, when the remote terminal line concentrating and connecting means 13a operates normally, since a line concentrating process has already been carried out in the remote terminal 10, the selecting means 52A sends a call from the subscriber's terminal 10 to the exchange transmission line 72. When the remote terminal line concentrating and connecting means 13a suffers a fault, since no line concentrating process has already been carried out in the remote terminal 10, the selecting means 52A operates the central terminal line concentrating and connecting means 58a to assign a call from the remote terminal 10 to an idle channel in the exchange transmission line 72 in a line concentrating process.

Consequently, the exchange 80 is supplied with a call signal which has been subjected to a line concentrating process, e.g., a call signal according to the V5.2 protocol.

In this manner, even though the remote terminal 10 does not have a redundant structure for performing its line concentrating capability, the subscriber system transmission apparatus 1 is capable of coping with a fault which the remote terminal line concentrating and connecting means 13a suffers. While the subscriber system transmission apparatus 1 which has been described above is of the point-to-point call processing type, the principles of the present invention are also applicable to a point-to-multipoint subscriber system transmission apparatus. According to the present invention, therefore, the subscriber system transmission apparatus has a simple efficient redundant structure for performing its line concentrating capability for increased overall system reliability.

A subscriber system transmission apparatus with a line concentrating capability according to a first embodiment of the present invention will be described below with reference to FIGS. 2 and 3. According to the first embodiment, the remote terminal line concentrating and connecting means 13a shown in FIG. 1 corresponds to a line concentrator connector 13 and a line concentration controller 17 shown in FIG. 2, the bypassing means 19a shown in FIG. 1 to a tributary trunk connection bus 19 shown in FIG. 2, and the mode selecting means 14a shown in FIG. 1 to a mode selector 14 and an RT controller 18 shown in FIG. 2. Furthermore, the selecting means 52A shown in FIG. 1 corresponds to a selector 52a and a CT controller 62 shown in FIG. 3, and the central terminal line concentrating and connecting means 58a shown in FIG. 1 corresponds to a time slot assignment unit (TSA) 58 and a line concentration controller 61 shown in FIG. 3.

Figure 2:
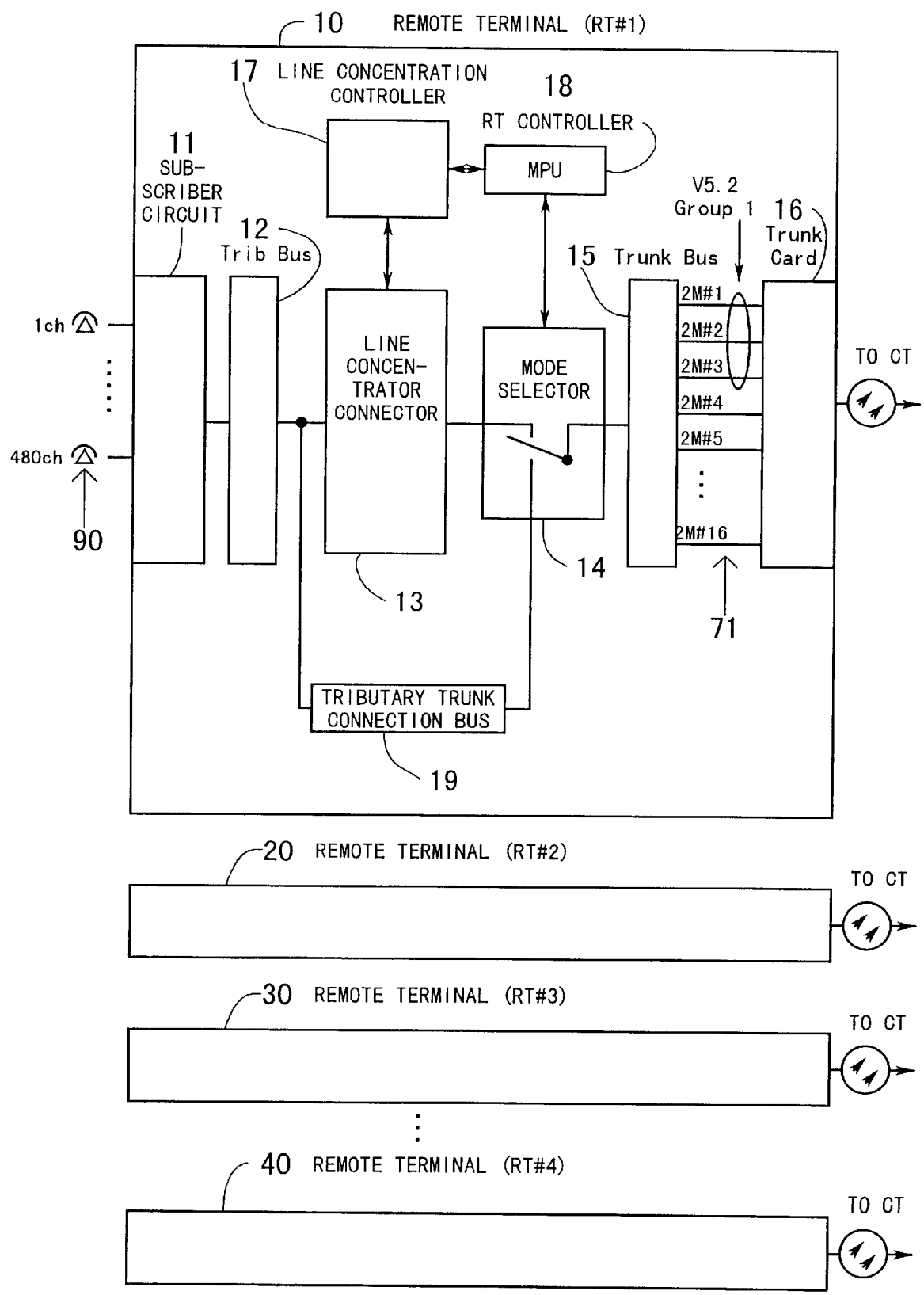
FIG. 2 is a block diagram of an internal structure of a remote terminal of a subscriber system transmission apparatus with a line concentrating capability according to a first embodiment of the present invention.

FIG. 2 shows in block form an internal structure of a remote terminal 10 of the subscriber system transmission apparatus according to the first embodiment of the present invention. In FIG. 2, the subscriber system transmission apparatus is of the point-to-multipoint call processing type. The subscriber system transmission apparatus has N remote terminals (RT#1–RT#N) 10–40 which identical to each other. Only the remote terminal (RT#1) 10 will be described below.

Subscriber's terminals 90 in the form of telephone sets in 480 channels are connected to the remote terminal (RT#1) 10. The remote terminal (RT#1) 10 comprises a subscriber circuit 11 for converting an analog signal to a digital signal, a tributary bus 12, a line concentrator connector 13, a mode selector 14, a trunk bus 15, a trunk card 16, a line concentration controller 17, an RT controller (MPU) 18, and a tributary bus connection bus 19. The line concentration controller 17 is referred to as a message controller, and controls the line concentrator connector 13 to carry out a line concentrating process thereby to assign time slots. The trunk bus 15 and the trunk card 16 are connected to each other by a trunk transmission line 71 having 16 channels 2M#1–2M#16 each having a transmission rate of 2 Mbps.

When the channels 2M#1–2M#3 of the trunk transmission line 71 are normal, the line concentration controller 17 and the line concentrator connector 13 carry out a line concentrating process which assigns a call to an idle channel in the trunk transmission line 71 each time a call is requested from a subscriber's terminal 90. Even if the trunk transmission line has a smaller number of channels than the number of subscriber's terminals 90, the trunk transmission line 71 can connect calls from subscriber's terminals 90. The trunk card 16 is a terminal unit for converting an electric signal to an optical signal. The RT controller (MPU) 18 comprises a microprocessor which monitors and controls the remote terminal (RT#1) 10 in its entirety. The RT controller (MPU) 18 monitors the operation of the line concentration controller 17 and the line concentrator connector 13. When the line concentration controller 17 and the line concentrator connector 13 operate normally, the RT controller (MPU) 18 controls the mode selector 14 to select a line concentrating process execution mode thereby to sends an output signal from the line concentrator connector 13 to the trunk bus 15. When the line concentration controller 17 or the line concentrator connector 13 suffers a fault, the RT controller (MPU) 18 controls the mode selector 14 to select a line concentrating process non-execution mode thereby to connect the tributary bus 12 through the tributary trunk connection bus 19 to the trunk bus 15 in bypassing relation to the line concentrator connector 13.

As described above, the trunk transmission line 71 which comprises 16 channels 2M#1–2M#16 each having a transmission rate of 2 Mbps is connected between the trunk bus 15 and the trunk card 16. In the line concentrating process execution mode, the channels 2M#1 2M#3 of the trunk transmission line 71 are used to transmit calls which are processed as a V5.2 group 1 by the line concentrating process. In the line concentrating process non-execution mode, the channels 2M#1–2M#16 of the trunk transmission line 71 are used to connect calls in the 480 channels which are not processed by the line concentrating process. A single audio channel is transmitted at a transmission rate of 64 Kbps. Therefore, 30 audio channels can be transmitted by a single channel, having a transmission rate of 2 Mbps, of the trunk transmission line 71. Therefore, in the line concentrating process execution mode, 90 audio channels are transmitted by the channels 2M#1–2M#3 to a central terminal 50, so that a line concentration ratio 16:3 (=480 ch:90 ch) is achieved. In the line concentrating process non-execution mode, all the 480 audio channels are transmitted by the channels 2M#1 2M#16 to the central terminal 50.

Figure 3:
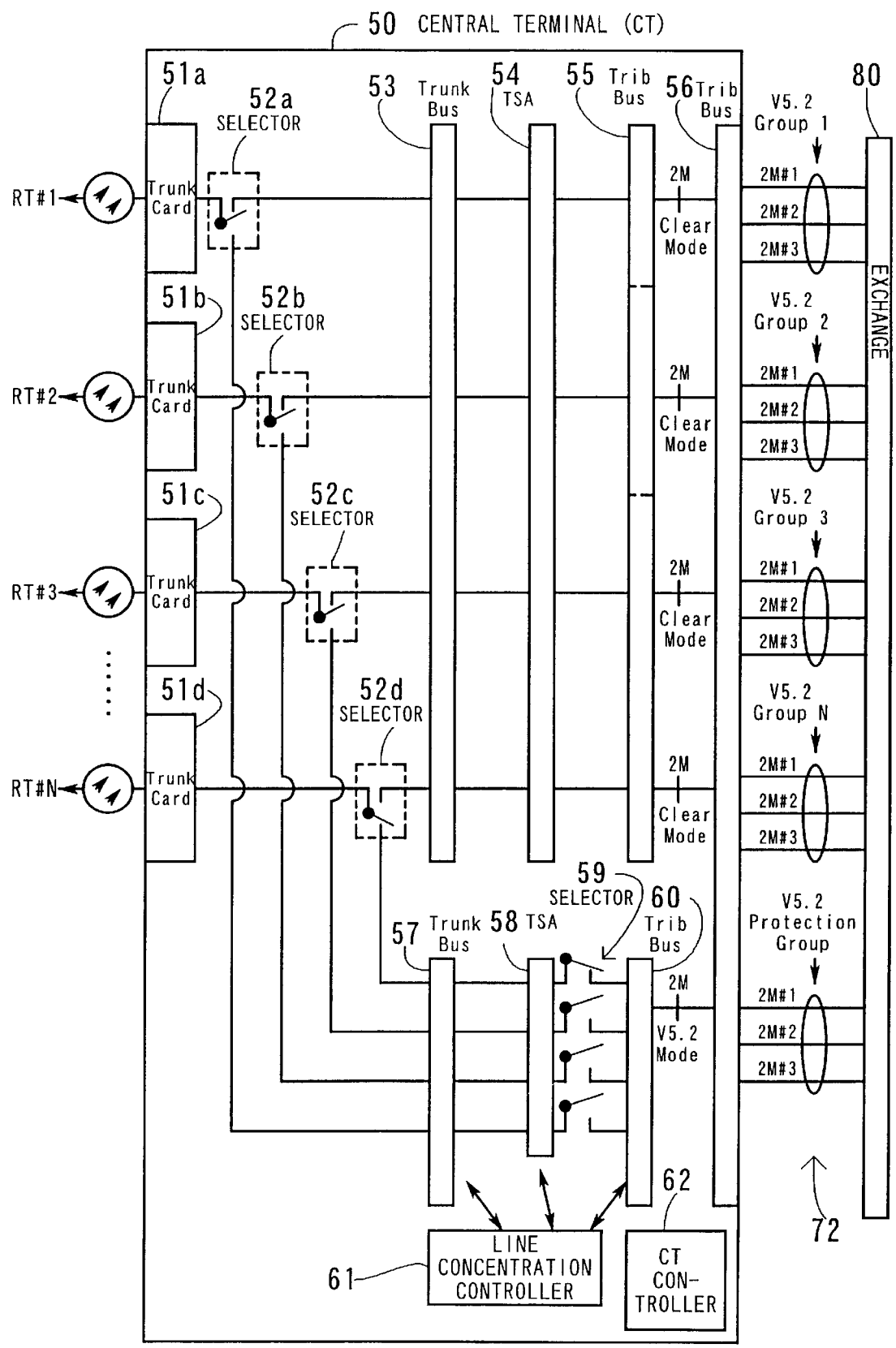
FIG. 3 is a block diagram of an internal structure of a central terminal of the subscriber system transmission apparatus with the line concentrating capability according to the first embodiment of the present invention.

FIG. 3 shows in block form an internal structure of the central terminal 50 of the subscriber system transmission apparatus according to the first embodiment of the present invention. In FIG. 3, the subscriber system transmission apparatus is of the point-to-multipoint call processing type.

The central terminal (CT) 50 is connected to the N remote terminals (RT#1–RT#N) 10–40. An exchange 80 is connected to the central terminal 50 by an exchange transmission line 72 which comprises channel bundles referred to as V5.2 groups 1–N and a V5.2 protection group.

The central terminal 50 comprises trunk cards 51a–51d connected respectively to the N remote terminals (RT#1–RT#N) 10–40, selectors 52a–52d connected respectively to the trunk cards 51a–51d, a trunk bus 53, a time slot assignment unit (TSA) 54 for assigning time slots, a tributary bus 55, a tributary card 56, a trunk bus 57, a time slot assignment unit (TSA) 58, selectors 59, a tributary bus 60, a line concentration controller 61, and a CT controller 62. Each of the trunk cards 51a–51d is a terminal unit for converting an optical signal to an electric signal. The selectors 52a–52d, 59 are controlled by the CT controller 62. The CT controller 62 comprises a microprocessor which monitors and controls the central terminal 50 in its entirety. The line concentration controller 61 is referred to as a message controller, and controls the time slot assignment unit 58 to carry out a line concentrating process thereby to assign time slots.

The CT controller 62 monitors the headers of signals transmitted respectively from the remote terminals (RT#1–RT#N) 10–40, and detects an alarm, contained in a header, which indicates a fault of the line concentrating capability in any of the remote terminals (RT#1–RT#N) 10–40. If the CT controller 62 does not detect any such alarm, then the CT controller 62 controls the selectors 52a–52d to connect the corresponding trunk cards 51a–51d to the trunk bus 53. Conversely, if the CT controller 62 detects an alarm indicating a fault of the line concentrating capability in any of the remote terminals (RT#1–RT#N) 10–40, then the CT controller 62 controls the corresponding one of the selectors 52a–52d to connect the corresponding one of the trunk cards 51a–5d to the trunk bus 57. In FIG. 3, the CT controller 62 detects an alarm indicating a fault of the line concentrating capability in the remote terminal (RT#N) 40. Therefore, the selector 52d connects the trunk card Slot to the trunk bus 57, rather than the trunk bus 53.

A signal which is transmitted to the trunk bus 57 has not been processed by a line concentrating process. This signal is subjected to a line concentrating process by the line concentration controller 61 and the time slot assignment unit 58. The CT controller 62 controls one of the selectors 59 to select and transmit the signal in the time slot assignment unit 58 which corresponds to the remote terminal (RT#N) 40 to the tributary bus 60. The signal which has been processed by the line concentrating process under the V5.2 protocol is transmitted through the tributary bus 56 and the V5.2 protection group of the exchange transmission line 72 to the exchange 80.

Since the central terminal 50 has a line concentrating capability as described above, even when any one of the remote terminals (RT#1–RT#N) 10–40 suffers a fault of the line concentrating capability thereof, the central terminal 50 effects a line concentrating process on a signal from the faulty remote terminal. Consequently, each of the remote terminals (RT#1–RT#N) 10–40 is not required to have a redundant structure for protection against a fault of the line concentrating capability.

While the subscriber system transmission apparatus has been described above is of the point-to-multipoint call processing type in the first embodiment, the principles of the first embodiment are also applicable to a point-to-point subscriber system transmission apparatus.

A subscriber system transmission apparatus with a line concentrating capability according to a second embodiment of the present invention will be described below with reference to FIGS. 4 and 5. According to the second embodiment, the line concentrating capability of the subscriber system transmission apparatus is prevented from having trouble even when a trunk transmission line suffers a fault.

Figure 4:
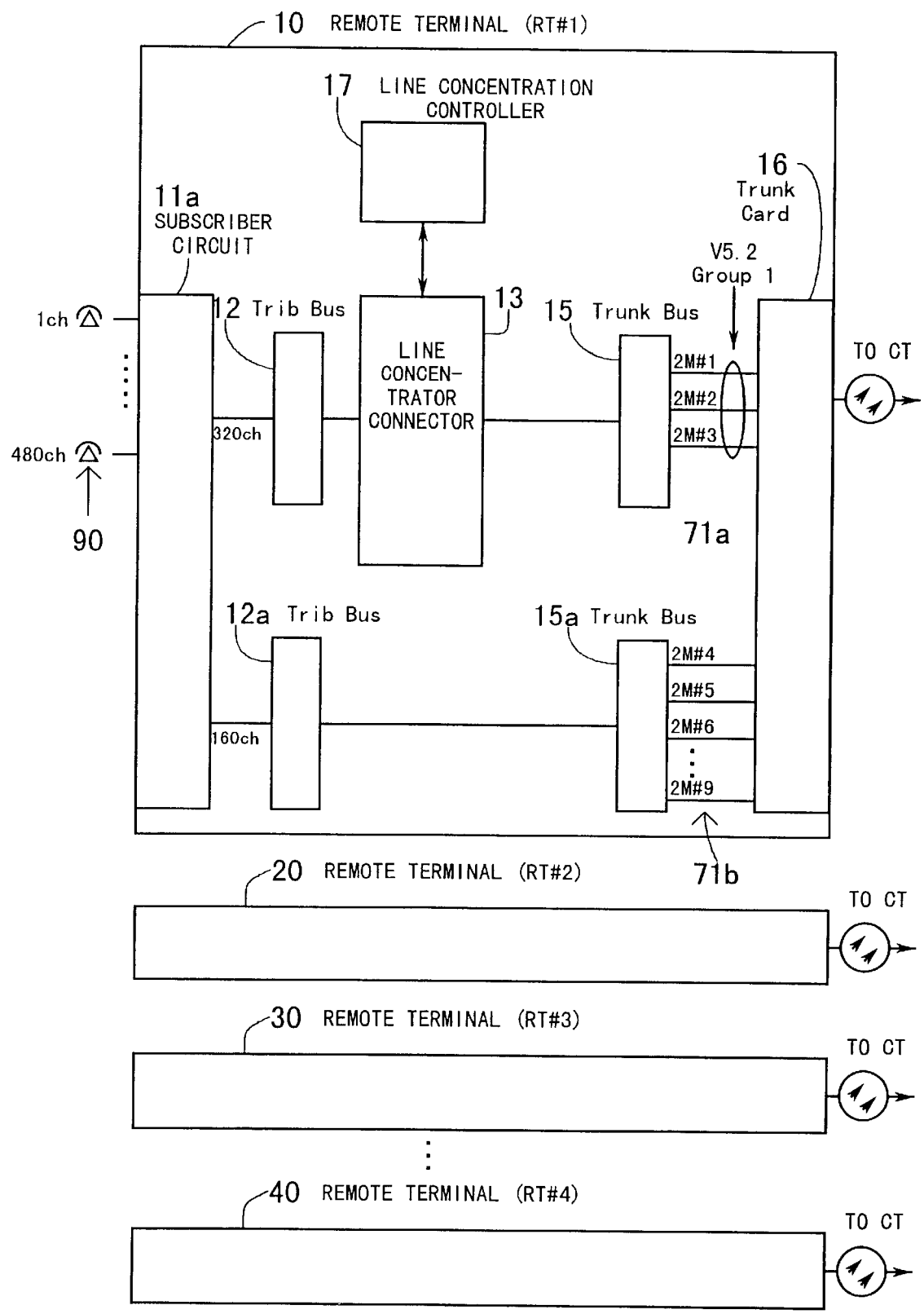
FIG. 4 is a block diagram of an internal structure of a remote terminal of a subscriber system transmission apparatus with a line concentrating capability according to a second embodiment of the resent invention.

FIG. 4 shows in block form an internal structure of a remote terminal 10 of the subscriber system transmission apparatus according to the second embodiment of the present invention. In FIG. 4, the subscriber system transmission apparatus is of the point-to-multipoint call processing type. The subscriber system transmission apparatus according to the second embodiment which is shown in FIG. 4 is basically the same as the subscriber system transmission apparatus according to the first embodiment which is shown in FIG. 2. Those parts of the subscriber system transmission apparatus according to the second embodiment, shown in FIG. 4, which are identical to those of the subscriber system transmission apparatus according to the first embodiment, shown in FIG. 2, are denoted by identical reference characters, and will not be described in detail below.

According to the second embodiment, the remote terminal (RT#1) 10 has a subscriber circuit 11a, and additionally includes a tributary bus 12a and a trunk bus 15a which are connected between the subscriber circuit 11a and the trunk card 16. The tributary bus 12a and the trunk bus 15a are directly connected to each other, without a line concentrating capability therebetween. A trunk transmission line 71b comprising six channels (2M#4–2M#9) each having a transmission rate of 2 Mbps is connected between the trunk bus 15a and the trunk card 16. Another trunk transmission line 71a comprising three channels (2M#1–2M#3) each having a transmission rate of 2 Mbps is connected between the trunk bus 15 and the trunk card 16.

When the channels 2M#1–2M#3 of the trunk transmission line 71a are normal, the line concentration controller 17 and the line concentrator connector 13 carry out a line concentrating process which assigns a call from a subscriber's terminal 90 to an idle channel in the trunk transmission line 71a each time a call is requested from the subscriber's terminal 90. The channels 2M#1–2M#3 transmit 90 audio channels, so that a line concentration ratio 16:3 (=480 ch:90 ch) is achieved.

When any one of the channels 2M#1–2M#3 of the trunk transmission line 71a suffers a fault, the subscriber circuit 11a sends 320 channels of the 480 channels of the subscriber's terminals 90 to the tributary bus 12 for a line concentrating process at a line concentration ratio 16:3 (=320 ch:60 ch). The remaining 160 channels of the subscriber's terminals 90 are sent to the tributary bus 12a, from which the 160 channels are transmitted through the trunk bus 15a and the six channels (2M#4–2M#9) of the trunk transmission line 71b to the trunk card 16 without a line concentrating process.

Figure 5:
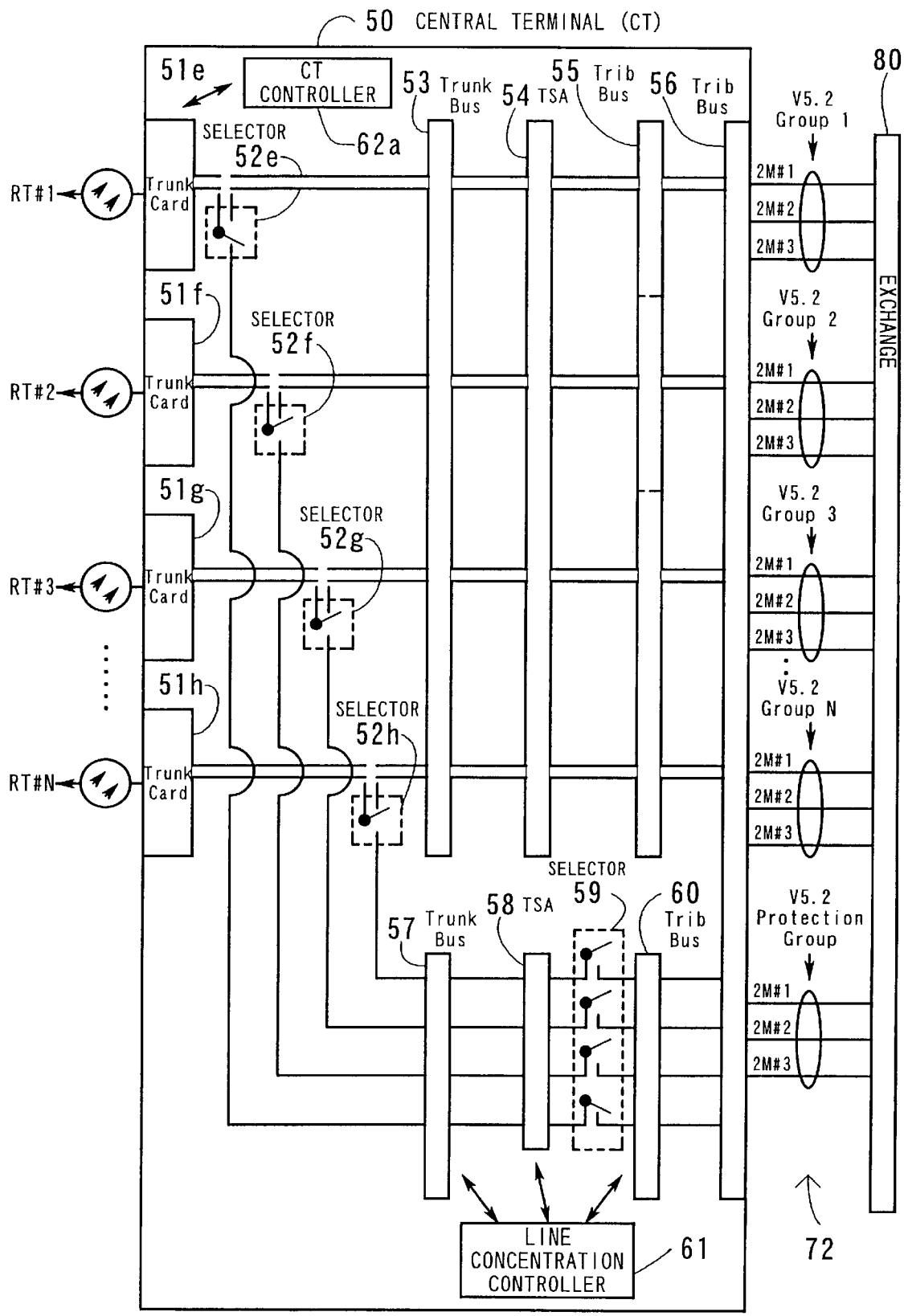
FIG. 5 is a block diagram of an internal structure of a central terminal of the subscriber system transmission apparatus with the line concentrating capability according to the second embodiment of the present invention.

FIG. 5 shows in block form an internal structure of a central terminal 50 of the subscriber system transmission apparatus according to the second embodiment of the present invention. In FIG. 5, the subscriber system transmission apparatus is of the point-to-multipoint call processing type. The subscriber system transmission apparatus according to the second embodiment which is shown in FIG. 5 is basically the same as the subscriber system transmission apparatus according to the first embodiment which is shown in FIG. 3. Those parts of the subscriber system transmission apparatus according to the second embodiment, shown in FIG. 5, which are identical to those of the subscriber system transmission apparatus according to the first embodiment, shown in FIG. 3, are denoted by identical reference characters, and will not be described in detail below.

According to the second embodiment, the central terminal 50 has trunk cards 51e–51h, selectors 52e–52h, and a CT controller 62a. The trunk card 51e sends a signal, which has been subjected to a line concentrating process, transmitted through the trunk transmission line 71a of the remote terminal 10 to the trunk bus 53, and sends a signal, which has not been subjected to a line concentrating process, transmitted through the trunk transmission line 71b of the remote terminal 10 to the selector 52e. The trunk cards 51f–51h corresponding respectively to the remote terminals (RT#2–RT#N) 20–40 also operate in the same manner as the trunk card 51e.

The CT controller 62a monitors the headers of signals transmitted respectively from the remote terminals (RT#1–RT#N) 10–40. When a monitored header contains an alarm indicating a fault in any of the remote terminals (RT#1–RT#N) 10–40, e.g., a fault of either one of the channels 2M#1–2M#3 of the trunk transmission line 71a in the remote terminal (RT#1) 10, the CT controller 62a detects the alarm. When the CT controller 62a detects no such faulty channel alarm, then the CT controller 62a controls the selectors 52e–52h to connect the respective trunk cards 51e–51h to the trunk bus 53. In this case, since no faulty channel alarm is detected, any signals that have not been subjected to a line concentrating process are not transmitted from the remote terminals (RT#1–RT#N) 10–40.

When the CT controller 62a detects an alarm indicating a fault of a channel which transmits a signal that has been processed by a line concentrating process, in any of the remote terminals (RT#1–RT#N) 10–40, the CT controller 62a controls the corresponding selector to connect the corresponding trunk card to the trunk bus 57. In FIG. 5, the CT controller 62a detects an alarm indicating a channel fault in the remote terminal (RT#N) 10. Therefore, the selector 52e sends a signal, which has not been processed by a line concentrating process, transmitted through the trunk transmission line 71b of the remote terminal 10 to the trunk bus 57.

Therefore, a signal which is sent to the trunk bus 57 has not been subjected to a line concentrating process. The signal sent to the trunk bus 57 is then subjected to a line concentrating process by the line concentration controller 61 and the time slot assignment unit 58. The CT controller 62a controls the corresponding one of the selectors 59 to select an output signal from the time slot assignment unit 58 which corresponds to the remote terminal (RT#1) 10 in FIG. 5 and sends the selected output signal to the tributary bus 60. Therefore, the signal which has been processed by the line concentrating process under the V5.2 protocol is transmitted through the V5.2 protection group of the exchange transmission line 72 to the exchange 80.

Since the central terminal 50 has a line concentrating capability as described above, even when any one of the remote terminals (RT#1–RT#N) 10–40 suffers a fault of the trunk transmission line, the central terminal 50 effects a line concentrating process on a signal from the faulty trunk transmission line. Consequently, the block loss probability is prevented from increasing, making it less difficult for telephone calls to be connected.

While the subscriber system transmission apparatus has been described above is of the point-to-multipoint call processing type in the second embodiment, the principles of the second embodiment are also applicable to a point-to-point subscriber system transmission apparatus.

A subscriber system transmission apparatus with a line concentrating capability according to a third embodiment of the present invention will be described below with reference to FIGS. 6 and 7. According to the third embodiment, the subscriber system transmission apparatus is arranged to cope with an increase in the block loss probability due to an increased number of call requests from subscriber's terminals.

Figure 6:
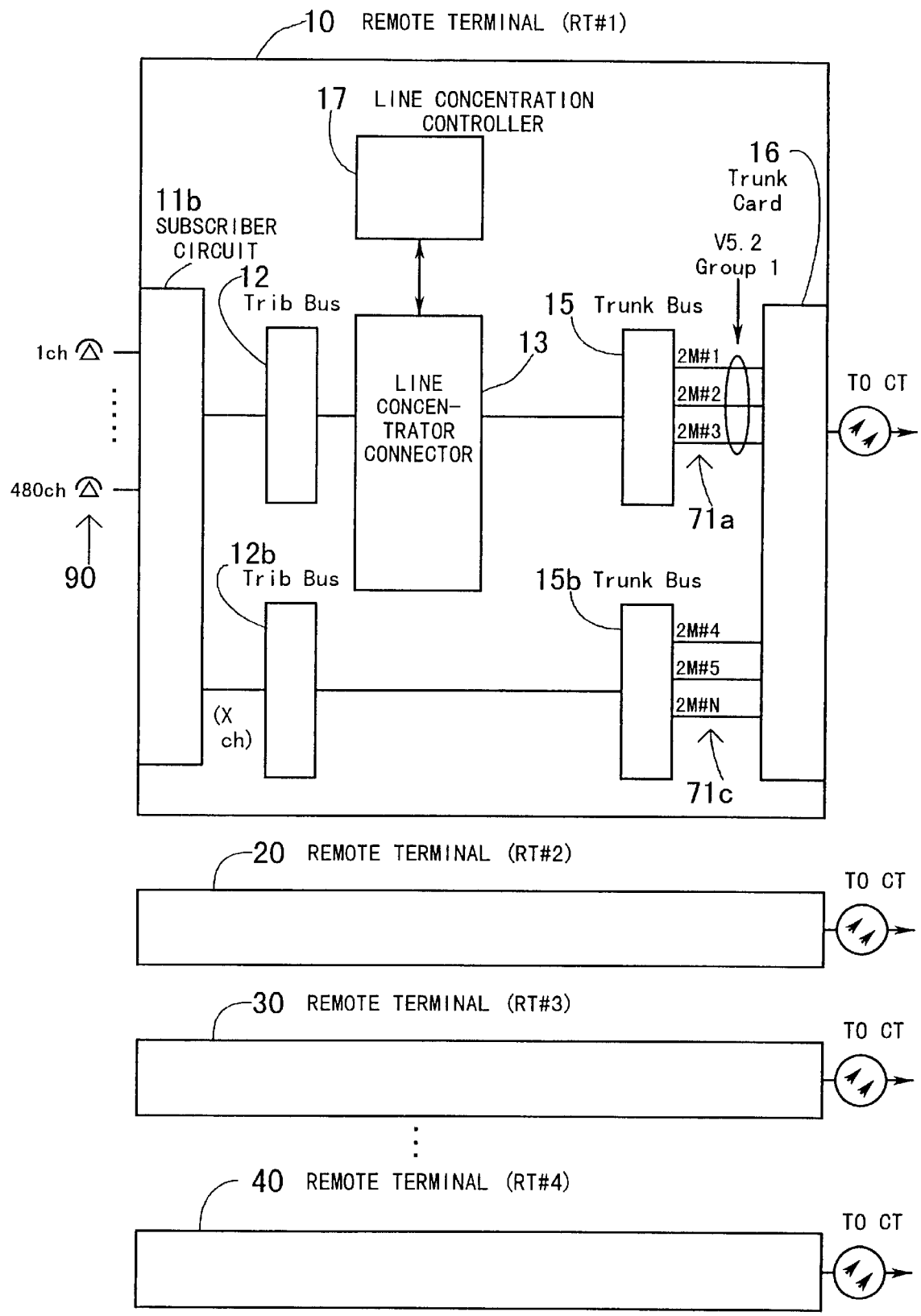
FIG. 6 is a block diagram of an internal structure of a remote terminal of a subscriber system transmission apparatus with a line concentrating capability according to a third embodiment of the present invention.

FIG. 6 shows in block form an internal structure of a remote terminal 10 of the subscriber system transmission apparatus according to the third embodiment of the present invention. In FIG. 6, the subscriber system transmission apparatus is of the point-to-multipoint call processing type. The subscriber system transmission apparatus according to the third embodiment which is shown in FIG. 6 is basically the same as the subscriber system transmission apparatus according to the second embodiment which is shown in FIG. 4. Those parts of the subscriber system transmission apparatus according to the third embodiment, shown in FIG. 6, which are identical to those of the subscriber system transmission apparatus according to the second embodiment, shown in FIG. 4, are denoted by identical reference characters, and will not be described in detail below.

According to the third embodiment, the remote terminal (RT#1) 10 has a subscriber circuit 11b, and additionally includes a tributary bus 12b and a trunk bus 15b which are connected between the subscriber circuit 11b and the trunk card 16. The tributary bus 12b and the trunk bus 15b are directly connected to each other, without a line concentrating capability therebetween. A trunk transmission line 71c comprising (N–3) channels (2M#4–2#N) each having a transmission rate of 2 Mbps is connected between the trunk bus 15b and the trunk card 16. Another trunk transmission line 71a comprising three channels (2M#1–2M#3) each having a transmission rate of 2 Mbps is connected between the trunk bus 15 and the trunk card 16.

Insofar as the number of call requests from subscriber's terminals 90 are 90 channels (30 2M channels×3) or less, the signal of a call from the subscriber circuit 11b is transmitted through the tributary bus 12, subjected to a line concentrating process by the line concentration controller 17 and the line concentrator connector 13, and then transmitted through the trunk bus 15 and the trunk transmission line 71a to the trunk card 16.

When the number of call requests from subscriber's terminals 90 exceeds 90 channels, resulting in a call loss, the subscriber circuit 11b separates X channels from the 480 channels of the subscriber's terminals 90, and sends the separated X channels to the tributary bus 12b and the trunk bus 15b. The X channels are not processed by a line concentrating process, and are transmitted through the trunk transmission line 71c to the trunk card 16. The remaining (480–X) channels of the 480 channels of the subscriber's terminals 90 are sent from the subscriber circuit 11b to the tributary bus 12, subjected to a line concentrating process by the line concentration controller 17 and the line concentrator connector 13, and then transmitted through the trunk bus 15 and the trunk transmission line 71a to the trunk card 16. Since a line concentration ratio is (480–):90 in this case, the extent of the line concentration is lower than at the line concentration ratio of 16:3, resulting in a reduced call loss.

Though X channels are separated from the 480 channels when the number of call requests from subscriber's terminals 90 exceeds 90 channels in the above description, X channels may be separated from the 480 channels when the number of call requests from subscriber's terminals 90 exceeds a predetermined number greater than 90 channels or the block loss probability exceeds a predetermined value.

Figure 7:
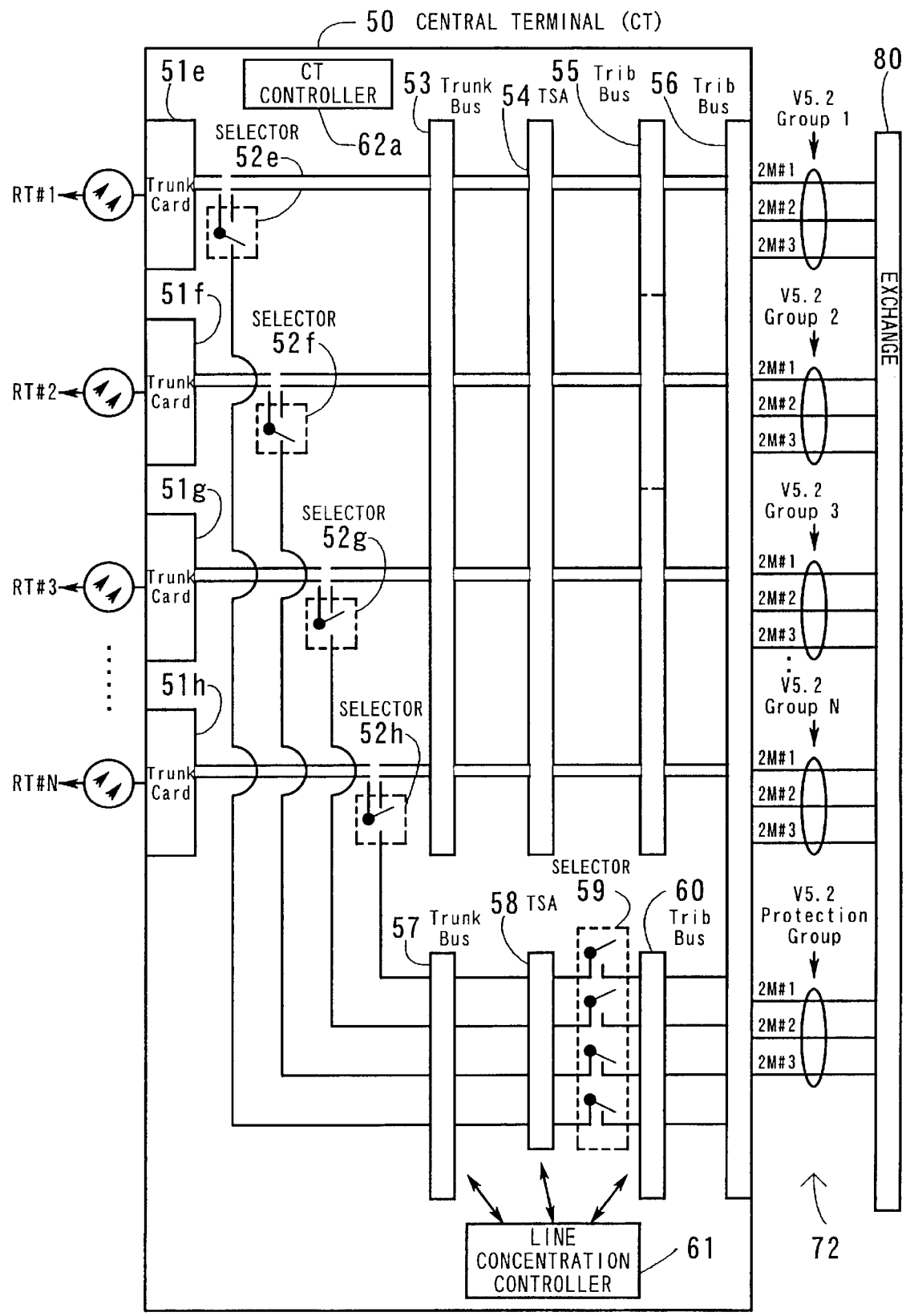
FIG. 7 is a block diagram of an internal structure of a central terminal of the subscriber system transmission apparatus with the line concentrating capability according to the third embodiment of the present invention.
Figure 8:
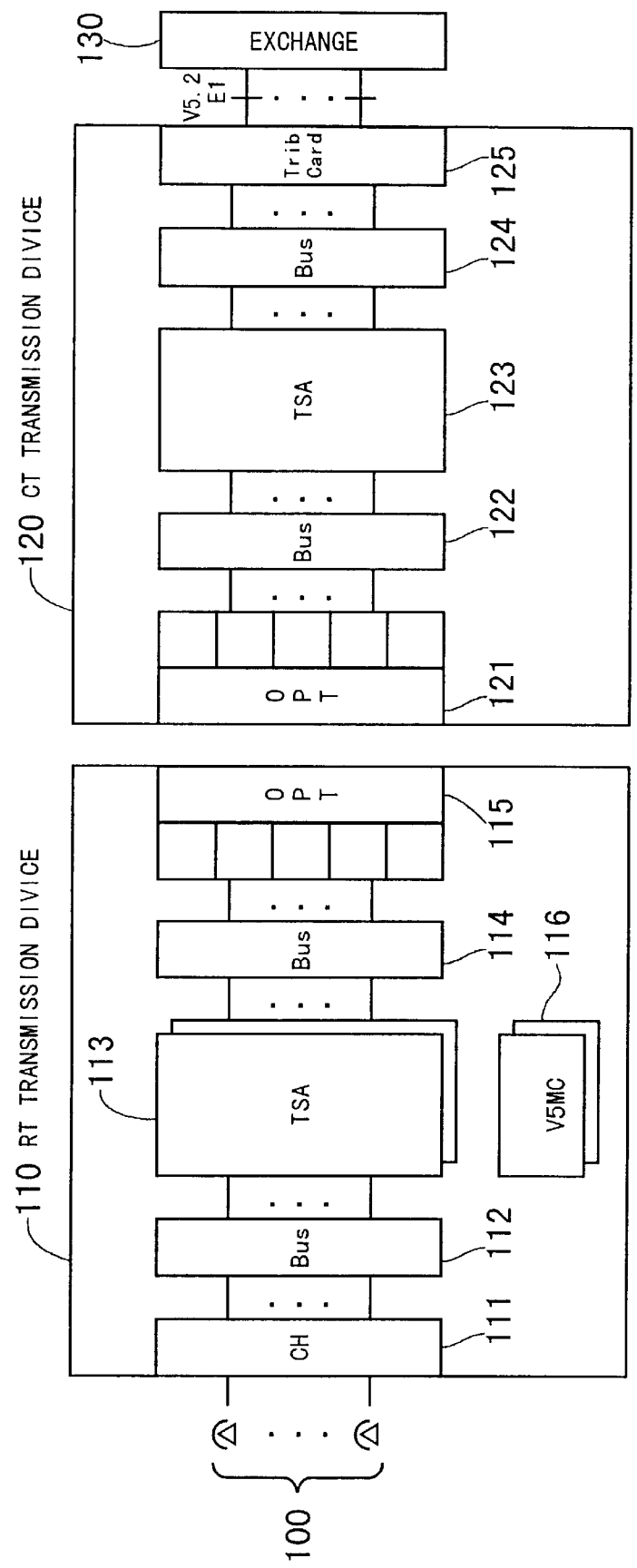
FIG. 8 is a block diagram of a conventional point-to-point subscriber system transmission apparatus with a line concentrating capability.
Figure 9:
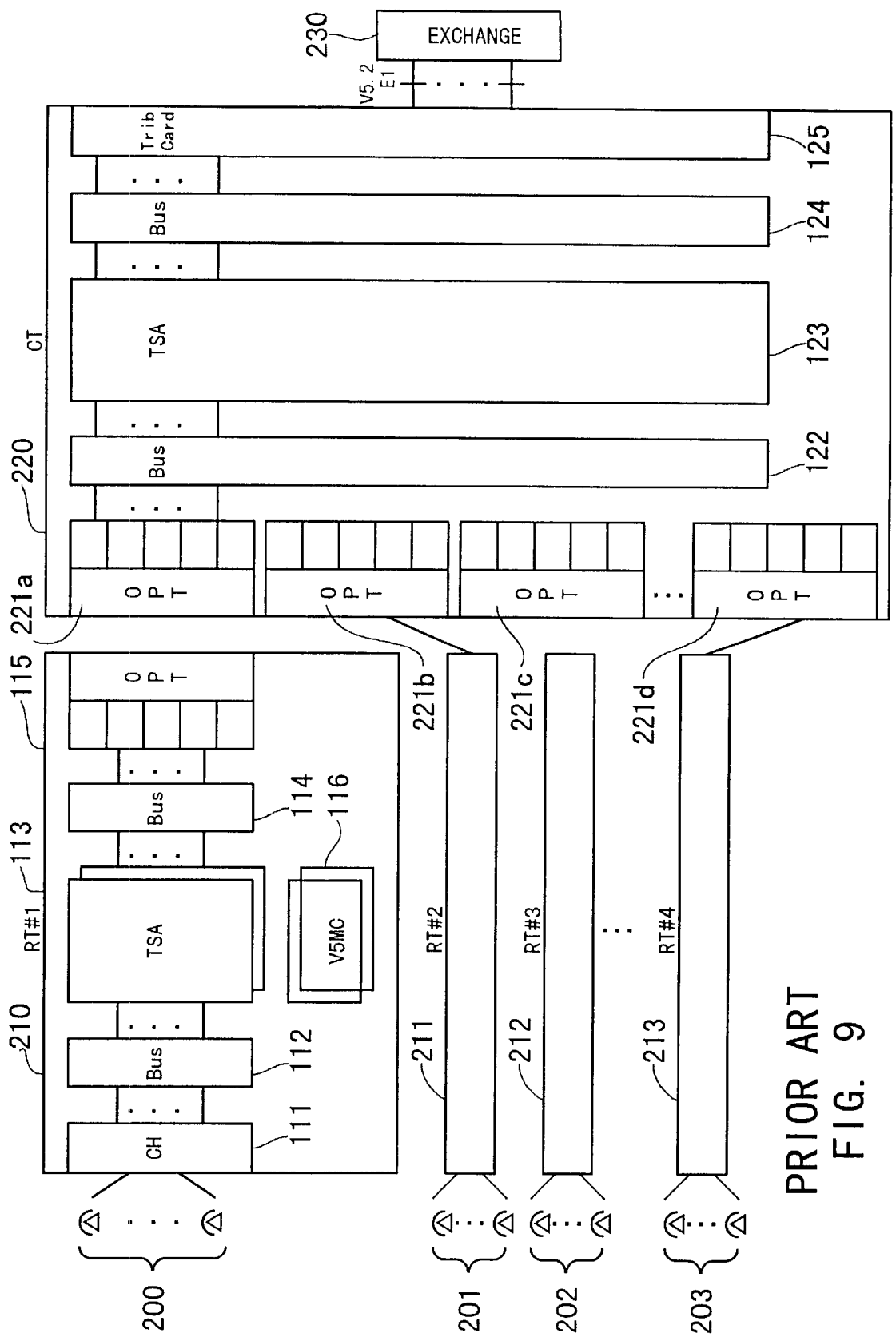
FIG. 9 is a block diagram of a conventional point-to-multipoint subscriber system transmission apparatus with a line concentrating capability.

FIG. 7 shows in block form an internal structure of a central terminal 50 of the subscriber system transmission apparatus according to the third embodiment of the present invention. In FIG. 7, the subscriber system transmission apparatus is of the point-to-multipoint call processing type. The subscriber system transmission apparatus according to the second embodiment which is shown in FIG. 7 is basically the same as the subscriber system transmission apparatus according to the second embodiment which is shown in FIG. 5 Those parts of the subscriber system transmission apparatus according to the second embodiment, shown in FIG. 7, which are identical to those of the subscriber system transmission apparatus according to the second embodiment, shown in FIG. 5, are denoted by identical reference characters, and will not be described in detail below.

The trunk card 51e sends a signal, which has been subjected to a line concentrating process, transmitted through the trunk transmission line 71a of the remote terminal 10 to the trunk bus 53, and sends a signal, which has not been subjected to a line concentrating process, transmitted through the trunk transmission line 71c of the remote terminal 10 to the selector 52e. The trunk cards 51f–51h corresponding respectively to the remote terminals (RT#2–RT#N) 20–40 also operate in the same manner as the trunk card 51e.

The CT controller 62a monitors the headers of signals transmitted respectively from the remote terminals (RT#1–RT#N) 10–40. When a monitored header contains an alarm indicating an increase in the number of calls in any of the remote terminals (RT#1–RT#N) 10–40, the CT controller 62a detects the alarm. When the CT controller 62a does not detect an alarm indicating an increase in the number of calls, the CT controller 62a controls the selectors 52e–52h to connect the respective trunk cards 51e–51h to the trunk bus 53. In this case, since an alarm indicating an increase in the number of calls is not detected, any signals that have not been subjected to a line concentrating process are not transmitted from the remote terminals (RT#1–RT#N) 10–40.

When the CT controller 62a detects an alarm indicating an increase in the number of calls in any of the remote terminals (RT#1–RT#N) 10–40, the CT controller 62a controls the corresponding selector to connect the corresponding trunk card to the trunk bus 57. In FIG. 7, the CT controller 62a detects an alarm an increase in the number of calls in each of the remote terminal (RT#) 10 and the remote terminal (RT#2) 20. Therefore, the selectors 52e, 52f send signals, which have not been processed by a line concentrating process, transmitted through the trunk transmission line 71c of the remote terminal (RT#1) 10 and the trunk transmission line, which sends signals not subjected to a line concentrating process, of the remote terminal (RT#2) 20 to the trunk bus 57.

Therefore, signals which are sent to the trunk bus 57 have not been subjected to a line concentrating process. The signals sent to the trunk bus 57 are then subjected to a line concentrating process by the line concentration controller 61 and the time slot assignment unit 58. The CT controller 62a controls the corresponding one of the selectors 59 to select output signals from the time slot assignment unit 58 which correspond to the remote terminal (RT#1) 10 and the remote terminal (RT#2) 20 in FIG. 6 and sends the selected output signals to the tributary bus 60. Therefore, the signals which have been processed by the line concentrating process under the V5.2 protocol is transmitted through the V5.2 protection group of the exchange transmission line 72 to the exchange 80.

Since the central terminal 50 has a line concentrating capability as described above, even when any one of the remote terminals (RT#1–RT#N) 10–40 has an increased block loss probability due to an increase in the number of calls, the remote terminals (RT#1–RT#N) 10–40 lower an extent of line concentration, and the central terminal 50 effects a line concentrating process. Consequently, the block loss probability is lowered, making it less difficult for telephone calls to be connected.

While the subscriber system transmission apparatus has been described above is of the point-to-multipoint call processing type in the third embodiment, the principles of the third embodiment are also applicable to a point-to-point subscriber system transmission apparatus.

In each of the above embodiments, optical signals are transmitted between the remote terminals (RT#1–RT#N) 10–40 and the central terminal 50. However, electric signals may be transmitted between the remote terminals (RT#1–RT#N) 10–40 and the central terminal 50.

With the arrangement of the present invention, as described above, the central terminal has the central terminal line concentrating and connecting means for carrying out a line concentrating process. When the remote terminal line concentrating and connecting means for carrying out a line concentrating process in the remote terminal suffers a fault, the remote terminal line concentrating and connecting means is not operated on a call, but the central terminal line concentrating and connecting means is operated to effect a line concentrating process on the call. Consequently, even though the remote terminal does not have a redundant structure for performing its line concentrating capability, the subscriber system transmission apparatus is capable of coping with a fault which the remote terminal line concentrating and connecting means suffers.

In the case where the present invention is applied to a point-to-multipoint subscriber system transmission apparatus, the subscriber system transmission apparatus has a simple efficient redundant structure for performing its line concentrating capability for increased overall system reliability.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A subscriber system transmission apparatus with a line concentrating capability, having a remote terminal connected to a subscriber's terminal and a central terminal to an exchange, said remote terminal being connected to said central terminal in series, comprising:

remote terminal line concentrating and connecting means disposed in said remote terminal, for effecting a line concentrating process on a call from the subscriber's terminal to assign the call to a trunk transmission line;

bypassing means disposed in said remote terminal, for bypassing said remote terminal line concentrating and connecting means to connect a call from the subscriber's terminal directly to the trunk transmission line;

mode selecting means disposed in said remote terminal, for selecting a mode of operation of said remote terminal line concentrating and connecting means when said remote terminal line concentrating and connecting means operates normally and selecting a mode of operation of said bypassing means when said remote terminal line concentrating and connecting means suffers a fault;

central terminal line concentrating and connecting means disposed in said central terminal, for effecting a line concentrating process on a call from said remote terminal to assign the call to an exchange transmission line; and selecting means for sending a call from said remote terminal to the exchange transmission line when said remote terminal line concentrating and connecting means operates normally and operating said central terminal line concentrating and connecting means when said remote terminal line concentrating and connecting means suffers a fault.

2. A subscriber system transmission apparatus with a line concentrating capability, having a plurality of remote terminals connected to subscriber's terminals and a central terminal connected to an exchange, said remote terminals being connected to said central terminal in series, comprising:

remote terminal line concentrating and connecting means disposed in each of said remote terminals, for effecting a line concentrating process on a call from each of the subscriber's terminals to assign the call to a trunk transmission line;

bypassing means disposed in each of said remote terminals, for bypassing the corresponding remote terminal line concentrating and connecting means to connect a call from each of the subscriber's terminals directly to the trunk transmission line;

mode selecting means disposed in each of said remote terminals, for selecting a mode of operation of said remote terminal line concentrating and connecting means when said remote terminal line concentrating and connecting means operates normally and selecting a mode of operation of said bypassing means when said remote terminal line concentrating and connecting means suffers a fault;

central terminal line concentrating and connecting means disposed in said central terminal, for effecting a line concentrating process on a call from each of said remote terminals to assign the call to an exchange transmission line; and selecting means disposed in said central terminal in association respectively with said remote terminals, for sending calls from said remote terminals to the exchange transmission line when the corresponding remote terminal line concentrating and connecting means operate normally and operating said central terminal line concentrating and connecting means when the corresponding remote terminal line concentrating and connecting means suffer a fault.

3. A subscriber system transmission apparatus with a line concentrating capability, having a remote terminal connected to a subscriber's terminal and a central terminal connected to an exchange, said remote terminal being connected to said central terminal in series, comprising:

remote terminal line concentrating and connecting means disposed in said remote terminal, for effecting a line concentrating process on a call from the subscriber's terminal to assign the call to a trunk transmission line;

bypassing means disposed in said remote terminal, for bypassing said remote terminal line concentrating and connecting means to connect as many calls directly to the trunk transmission line as the number of channels of said trunk transmission line which suffer a fault;

transfer means disposed in said central terminal, for sending a call transmitted through said remote terminal line concentrating and connecting means to an exchange transmission line; and central terminal line concentrating and connecting means disposed in said central terminal, for effecting a line concentrating process on a call transmitted through said bypassing means to assign the call to the exchange transmission line.

4. A subscriber system transmission apparatus with a line concentrating capability, having a plurality of remote terminals connected to subscriber's terminals and a central terminal connected to an exchange, said remote terminals being connected to said central terminal in series, comprising:

remote terminal line concentrating and connecting means disposed in each of said remote terminals, for effecting a line concentrating process on a call from each of the subscriber's terminals to assign the call to a trunk transmission line;

bypassing means disposed in each of said remote terminals, for bypassing the corresponding remote terminal line concentrating and connecting means to connect as many calls directly to the trunk transmission line as the number of channels of said transmission line which suffer a fault;

transfer means disposed in said central terminal in association respectively with said remote terminals, for sending a call transmitted through the corresponding remote terminal line concentrating and connecting means to an exchange transmission line;

central terminal line concentrating and connecting means disposed in said central terminal, for effecting a line concentrating process on a call from each of said remote terminals to assign the call to the exchange transmission line; and transmission means disposed in said central terminal in association respectively with said remote terminals, for transmitting a call transmitted through the corresponding bypassing means to said central terminal line concentrating and connecting means.

5. A subscriber system transmission apparatus with a line concentrating capability, having a remote terminal connected to a subscriber's terminal and a central terminal connected to an exchange, said remote terminal being connected to said central terminal in series, comprising:

remote terminal line concentrating and connecting means disposed in said remote terminal, for effecting a line concentrating process on a call from the subscriber's terminal to assign the call to a trunk transmission line;

bypassing means disposed in said remote terminal, for deleting a predetermined number of subscribers from the line concentrating process effected by said remote terminal line concentrating and connecting means when the number of calls from the subscriber's terminal exceeds a reference number, and connecting calls of said subscribers directly to the trunk transmission line;

transfer means disposed in said central terminal, for sending a call transmitted through said remote terminal line concentrating and connecting means to an exchange transmission line; and central terminal line concentrating and connecting means disposed in said central terminal, for effecting a line concentrating process on a call transmitted through said bypassing means to assign the call to the exchange transmission line.

6. A subscriber system transmission apparatus with a line concentrating capability, having a plurality of remote terminals connected to subscriber's terminals and a central terminal connected to an exchange, said remote terminals being connected to said central terminal in series, comprising:

remote terminal line concentrating and connecting means disposed in each of said remote terminals, for effecting a line concentrating process on a call from each of the subscriber's terminals to assign the call to a trunk transmission line;

bypassing means disposed in each of said remote terminals, for deleting a predetermined number of subscribers from the line concentrating process effected by the corresponding remote terminal line concentrating and connecting means when the number of calls from the subscriber's terminals exceeds a reference number, and connecting calls of said subscribers directly to the trunk transmission line;

transfer means disposed in said central terminal in association respectively with said remote terminals, for sending a call transmitted through the corresponding remote terminal line concentrating and connecting means to an exchange transmission line;

central terminal line concentrating and connecting means disposed in said central terminal, for effecting a line concentrating process on a call from each of said remote terminals to assign the call to the exchange transmission line; and transmission means disposed in said central terminal in association respectively with said remote terminals, for transmitting a call transmitted through the corresponding bypassing means to said central terminal line concentrating and connecting means.

7. A subscriber system transmission apparatus with a line concentrating capability according to claim 1, which is applied to a plesiochronous digital hierarchy.

8. A subscriber system transmission apparatus with a line concentrating capability according to claim 1, which is applied to a synchronous digital hierarchy.

9. A subscriber system transmission apparatus with a line concentrating capability according to claim 1, which is governed by the V5.2 protocol according to the International Telecommunication Union—Telecommunication Sector.

10. The subscriber system transmission apparatus of claim 5, wherein said subscriber system transmission apparatus is applied to a plesiochronous digital hierarchy.

11. The subscriber system transmission apparatus of claim 5, wherein said subscriber system transmission apparatus is applied to a synchronous digital hierarchy.

12. The subscriber system transmission apparatus of claim 5, wherein said subscriber system transmission apparatus is governed by the V5.2 protocol according to the International Telecommunication Union—Telecommunication Sector.

* * * * *